(12) United States Patent
Lamontia et al.

(10) Patent No.: US 9,115,831 B2
(45) Date of Patent: Aug. 25, 2015

(54) MULTILAYER REINFORCED HOSE

(71) Applicant: E I DU PONT DE NEMOURS AND COMPANY, Wilmington, DE (US)

(72) Inventors: Mark Allan Lamontia, Landenberg, PA (US); David William Litchfield, Midlothian, VA (US); Caio P. Faury, Barueri (BR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 209 days.

(21) Appl. No.: 13/925,081

(22) Filed: Jun. 24, 2013

(65) Prior Publication Data

US 2014/0373962 A1  Dec. 25, 2014

(51) Int. Cl.
| | |
|---|---|
| *F16L 11/08* | (2006.01) |
| *F16L 11/02* | (2006.01) |
| *B32B 5/26* | (2006.01) |
| *B32B 27/12* | (2006.01) |
| *B32B 27/30* | (2006.01) |
| *B32B 27/34* | (2006.01) |
| *B32B 1/08* | (2006.01) |
| *F16L 11/04* | (2006.01) |

(52) U.S. Cl.
CPC . *F16L 11/02* (2013.01); *B32B 1/08* (2013.01); *B32B 5/26* (2013.01); *B32B 27/12* (2013.01); *B32B 27/304* (2013.01); *B32B 27/34* (2013.01); *F16L 11/045* (2013.01); *F16L 11/086* (2013.01); *F16L 11/087* (2013.01); *B32B 2250/04* (2013.01); *B32B 2305/184* (2013.01); *B32B 2305/188* (2013.01); *B32B 2597/00* (2013.01)

(58) Field of Classification Search
CPC ........ F16L 11/08; F16L 11/085; F16L 11/086; F16L 11/087
USPC .......................... 138/123, 124, 125
See application file for complete search history.

(56) References Cited

U.S. PATENT DOCUMENTS

| | | | |
|---|---|---|---|
| 3,094,511 A | 6/1963 | DuPont | |
| 3,354,127 A | 11/1967 | DuPont | |
| 3,673,143 A | 6/1972 | Bair et al. | |
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 3,905,398 A * | 9/1975 | Johansen et al. | 138/124 |
| 4,172,938 A | 10/1979 | Mera et al. | |
| 4,273,160 A | 6/1981 | Lowles | |
| 4,343,333 A * | 8/1982 | Keister | 138/125 |
| 4,384,595 A * | 5/1983 | Washkewicz et al. | 138/127 |
| 4,699,178 A * | 10/1987 | Washkewicz et al. | 138/125 |
| 5,052,444 A * | 10/1991 | Messerly et al. | 138/125 |

(Continued)

FOREIGN PATENT DOCUMENTS

WO   WO2012172290   12/2012

*Primary Examiner* — James Hook

(57) ABSTRACT

A multilayer hose comprising in order, (i) a thermoplastic inner liner, (ii) at least one first fibrous reinforcement layer comprising continuous filament yarns having a yarn tenacity of at least 13 grams per dtex, (iii) at least one second fibrous reinforcement layer comprising continuous filament yarns having a yarn tenacity of at least 13 grams per dtex, and (iv) a thermoplastic outer cover wherein the continuous filament yarns of the at least one second fibrous reinforcement layer have a yarn modulus greater than the yarn modulus of the continuous filament yarns of the at least one first fibrous reinforcement.

9 Claims, 3 Drawing Sheets

(56) References Cited

U.S. PATENT DOCUMENTS

| | | | |
|---|---|---|---|
| 5,378,538 A * | 1/1995 | Makino et al. | 428/364 |
| 5,499,661 A | 3/1996 | Odru et al. | |
| 6,112,771 A * | 9/2000 | Aoyagi et al. | 138/127 |
| 6,179,008 B1 * | 1/2001 | Kawazura et al. | 138/125 |
| 6,677,018 B1 * | 1/2004 | Satoh | 428/36.9 |
| 7,572,745 B2 * | 8/2009 | Branch et al. | 442/310 |
| 2005/0121095 A1 * | 6/2005 | Ono et al. | 138/126 |
| 2009/0049868 A1 * | 2/2009 | Malloy | 66/170 |
| 2010/0326558 A1 | 12/2010 | Do | |
| 2012/0125470 A1 * | 5/2012 | Nanney et al. | 138/125 |
| 2013/0239539 A1 * | 9/2013 | Li et al. | 57/3 |
| 2015/0090358 A1 * | 4/2015 | Lamontia et al. | 138/125 |

* cited by examiner

MULTILAYER REINFORCED HOSE

BACKGROUND

1. Field of the Invention

This invention pertains to a multilayer reinforced hose that is particularly suitable for use in a service umbilical.

2. Description of Related Art

Hoses used in umbilicals contain layers of reinforcing fibers braided over a thermoplastic polymer liner. Umbilicals provide the connecting medium for electrical, hydraulic, chemical injection, and fiber optic connections between topside facilities (ocean and sea surface structures, for example) and various subsea items. A common cause of hose failure is reinforcement failure. There is a need, therefore, to provide solutions that can extend the useful life of reinforcement layers in an umbilical hose.

SUMMARY OF THE INVENTION

This invention pertains to a multilayer hose comprising in order:
(i) a thermoplastic inner liner,
(ii) at least one first fibrous reinforcement layer comprising continuous filament yarns having a yarn tenacity of at least 13 grams per dtex,
(iii) at least one second fibrous reinforcement layer comprising continuous filament yarns having a yarn tenacity of at least 13 grams per dtex, and
(iv) a thermoplastic outer cover,
wherein the continuous filament yarns of the at least one second fibrous reinforcement layer have a yarn modulus greater than the yarn modulus of the continuous filament yarns of the at least one first fibrous reinforcement.

The invention further pertains to a multilayer hose comprising in order:
(i) a thermoplastic inner liner,
(ii) at least one first fibrous reinforcement layer comprising continuous filament yarns having a yarn tenacity of at least 13 grams per dtex,
(iii) at least one second fibrous reinforcement layer comprising continuous filament yarns having a yarn tenacity of at least 13 grams per dtex,
(iv) at least one intermediate fibrous reinforcement layer comprising continuous filament yarns having a yarn tenacity of at least 13 grams per dtex positioned between the at least one first and the at least one second fibrous reinforcement layers, and
(v) a thermoplastic outer cover,
wherein
  (a) the continuous filament yarns of any at least one intermediate fibrous reinforcement layer have a yarn modulus greater than the yarn modulus of the continuous filament yarns of the at least one first fibrous reinforcement layer and no less than the yarn modulus of the continuous filament yarns of the at least one second fibrous reinforcement layer, and
  (b) the continuous filament yarns of any at least one intermediate fibrous layer have yarn modulus no less than yarn modulus of any other at least one intermediate fibrous reinforcement layer positioned closer to the at least one first layer.

DETAILED DESCRIPTION

Umbilical

Figure 1:
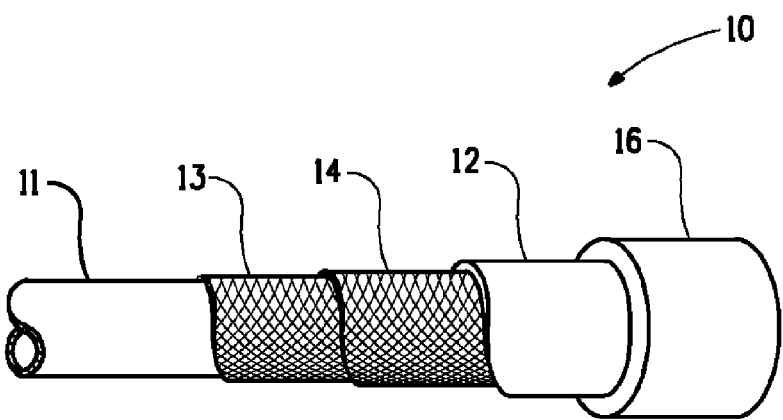
FIG. 1 depicts a cutaway perspective of one embodiment of a hose comprising two fibrous reinforcement layers.

An example of an umbilical thermoplastic hose (hereinafter called 'hose') is shown, generally, at 10 in FIG. 1. The hose can have a coupling 16 attached to both ends. The hose comprises a thermoplastic polymeric inner liner 11 and a thermoplastic polymeric outer cover 12. Located between the liner and cover are two fibrous reinforcement layers, a first fibrous layer 13 and a second fibrous layer 14. 'Hydraulic' embodiments of the hose must resist internal hydrostatic pressure only, and liner 11 is the innermost layer. 'HCR' (High Collapse Resistance) embodiments of a hose must withstand both internal and external hydrostatic pressure, and contain an interlocking stainless steel carcass, not shown, as the innermost component. The present invention pertains to fibrous reinforcing layers and applies to both 'hydraulic' and 'HCR' hoses.

Figure 2:
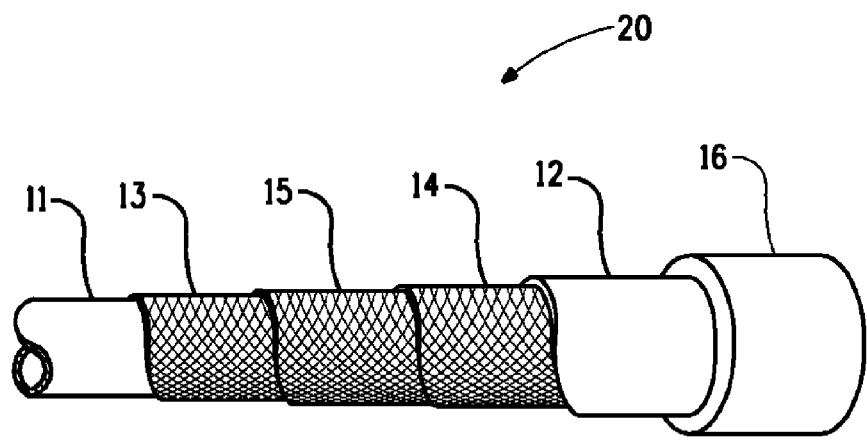
FIG. 2 depicts a cutaway perspective of a hose comprising three fibrous reinforcement layers.

FIG. 2 shows at 20 another embodiment of a hose comprising an intermediate fibrous reinforcement layer 15 located between the first fibrous layer 13 and the second fibrous layer 14.

Inner Liner

Suitable inner liner hose materials include aliphatic polyamide or polyvinylidenefluoride. A suitable polyamide is Nylon 11.

Outer Cover

Suitable hose outer cover materials include polyethylene, polyurethane, polyethylene, polypropylene, and aliphatic polyamide. A suitable polyamide is Nylon 12.

Reinforcement Layers

The hose comprises a plurality of fibrous reinforcement layers as is shown at 13-14 in FIG. 1 and at 13-15 in FIG. 2. Preferably, the layers are in the form of a braided fabric, a woven fabric, or a unidirectional fabric. A braided fabric is formed by plaiting several strands of fibrous yarn. The yarns are interlaced diagonally to the axial direction of the hose.

A woven fabric comprises warp and fill yarns, interlaced orthogonally to each other—the warp yarns being parallel to the fabric production direction. The woven fabric can be a plain weave, crowfoot weave, basket weave, satin weave, twill weave, unbalanced weave, or any other weave style.

All unidirectional fabric reinforcement yarns are aligned in the direction parallel to the fabric production direction. There may be a few lightweight yarns in the fill direction used to help maintain the alignment of the reinforcement yarns. When woven or unidirectional fabrics are used, the fabric width is preferably less than 25 mm, that is to say that the fabrics are considered to be narrow fabrics. The reinforcement layer yarns comprise a plurality of continuous filaments. The terms fiber and filament may be used interchangeably. By continuous, is meant that the fibers have a high length-to-diameter ratio. Typically, a bobbin of continuous filament yarn has a length of several thousand meters. A typical filament diameter is about 0.015 mm.

In some embodiments, the continuous filament yarns may be twisted or entangled. Twisting is the process of combining two or more singles yarns into a plied yarn or cord. In some embodiments, the twist level as described by a twist multiplier ranges from zero to 2.5. As used here, twist multiplier is as defined in ASTM D123-12. An entangled yarn or cord is one in which at least two single yarns are intermixed with each other without adding twist or otherwise disturbing the parallel relationship of the combined filaments. This is also known as comingling or compacting. Twisting and entangling are well known terms in the textile art.

The reinforcement layer yarns have a tenacity of at least 13 grams per dtex. In some embodiments, the yarn tenacity is at least 18 grams per dtex or even 25 grams per dtex. The yarns also have an initial modulus of at least 550 grams per dtex or even 750 grams per dtex. In some embodiments, the yarn modulus is at least 900 grams per dtex.

Figure 3:
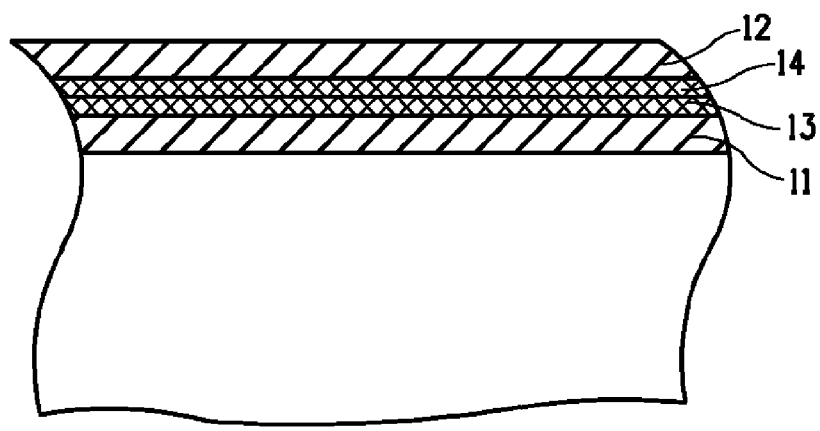
FIG. 3 is a half-sectional longitudinal view of a hose comprising two fibrous reinforcement layers.

A requirement of one embodiment of this invention is that the hose comprises at least one first fibrous reinforcement layer and at least one second fibrous reinforcement layer, wherein, the continuous filament yarns of the at least one second fibrous reinforcement layer have a yarn modulus greater than the continuous filament yarn modulus of the at least one first fibrous reinforcement. FIG. 3 shows a hose construction comprising at least one first fibrous reinforcement layer 13 and at least one second fibrous reinforcement layer 14 located between a liner 11 and a cover 12. The yarns of the at least one first fibrous reinforcement layer 13 have a lower modulus than the yarns of the at least one second fibrous reinforcement layer 14.

Figure 4:
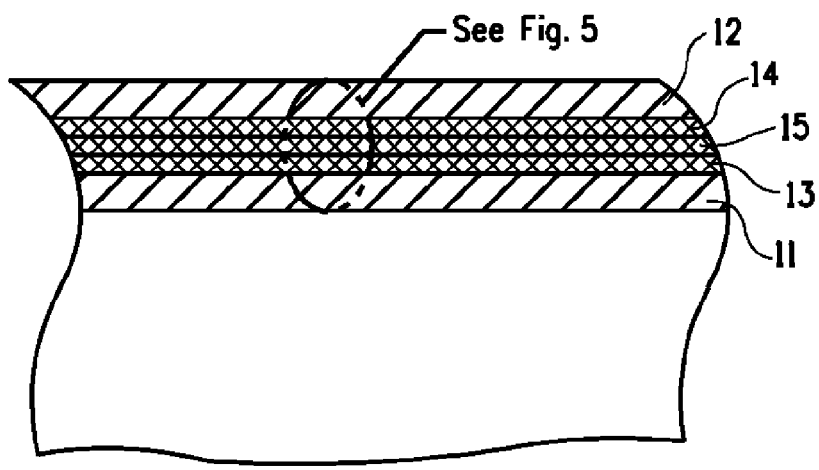
FIG. 4 is a half-sectional longitudinal view through a hose comprising three fibrous reinforcement layers.

FIG. 4 depicts another embodiment of this invention in which at least one intermediate fibrous reinforcement layer 15 is positioned between the at least one first fibrous reinforcement layer 13 and the at least one second fibrous reinforcement layer 14. In this construction, the continuous filament yarns of any at least one intermediate fibrous reinforcement layer have a yarn modulus greater than the continuous filament yarn modulus of the at least one first fibrous reinforcement layer and less than the yarn modulus of the continuous filament yarns of the at least one second fibrous reinforcement layer.

There may be a plurality of first fibrous reinforcement layers, but the yarn modulus of all yarns comprising the plurality of first reinforcement layers must be the same.

Similarly, there may be a plurality of second fibrous reinforcement layers, but the yarn modulus of all yarns comprising the plurality of second reinforcement layers must be the same.

In a like manner, there may be a plurality of intermediate fibrous reinforcement layers, but the yarns of any one intermediate fibrous reinforcement layer must have a yarn modulus greater than the yarn modulus of the continuous filament yarns of the at least one first fibrous reinforcement layer and less than the yarn modulus of the continuous filament yarns of the at least one second fibrous reinforcement layer.

Figure 5:
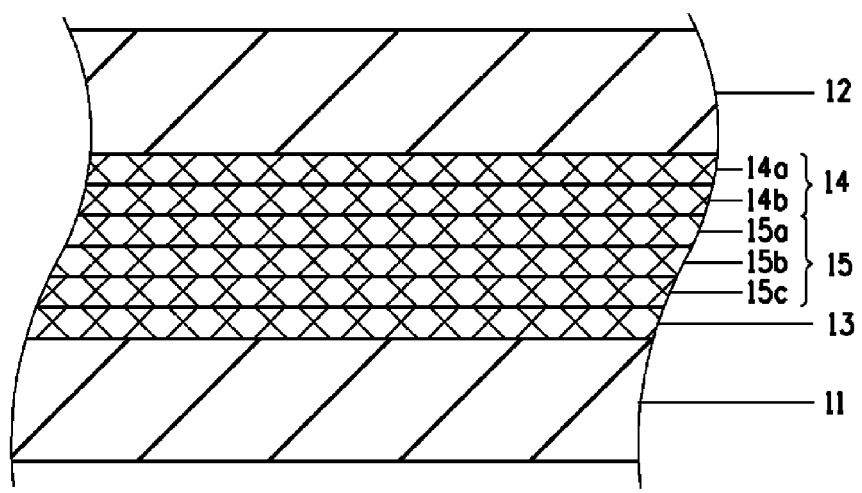
FIG. 5 is a half-sectional longitudinal view through another embodiment of a hose.

Intermediate fibrous reinforcement layers may comprise layers having the same or different moduli. The yarns within a layer may have different moduli or all the yarns within one layer may have the same modulus but the moduli between layers may be different. If a plurality of intermediate fibrous reinforcement layers 15 comprise yarns of a different modulus, the layers must be positioned such that the yarn modulus of an at least one intermediate fibrous layer is no less than yarn modulus of any other at least one intermediate fibrous reinforcement layer positioned closer to the at least one first layer 13. As an example of this, refer to FIG. 5. Layers 11 and 12 are as previously stated. FIG. 5 shows one first reinforcement layer 13 and two second reinforcement layers 14a and 14b. A plurality of intermediate fibrous reinforcement layers are shown as 15a, 15b and 15c. In the embodiment of FIG. 5, the yarns of the first reinforcement layer 13 have the lowest modulus of any reinforcement layer. The two layers 14a and 14b of the second reinforcement layer have a higher yarn modulus than the modulus of yarns in layers 15a-15c and 13. The yarn modulus of 14a is the same as that of 14b. The yarn modulus of the intermediate reinforcement layers 15a, 15b and 15c may all be the same or different with the proviso previously disclosed defining the yarn modulus relationship with the yarns of layers 13 and 14. Layer 15a has the highest yarn modulus of layers 15a-15c. Layer 15b may have the same or lower yarn modulus than that of 15a or alternatively may have the same or higher modulus than layer 15c. In other words, the moduli (E) of layers 15a-15c are in the order of E15a≥E15b≥E15c.

Reinforcement Fibers

Preferably, the continuous filament yarns are made of aromatic polyamide or aromatic co-polyamide. A preferred aromatic polyamide is p-aramid that is available from E.I. du Pont de Nemours and Company, Wilmington, Del. under the tradename Kevlar® or from Teijin Aramid, Conyers, Ga. under the tradenames Twaron® and Technora®. Some suitable fibers are listed in Table 1.

TABLE 1

| Yarn Type | Tensile Modulus (g/dtex) | Tenacity (g/dtex) |
|---|---|---|
| Kevlar ® 119 | 500 | 27 |
| Kevlar ® 29 | 667 | 25 |
| Kevlar ® 29AP | 667 | 29 |
| Kevlar ® 129 | 833 | 30 |
| Kevlar ® 49 | 944 | 24 |
| Kevlar ® 49AP | 1033 | 25 |

As used herein, the term para-aramid filaments means filaments made of para-aramid polymer. The term aramid means a polyamide wherein at least 85% of the amide (—CONH—) linkages are attached directly to two aromatic rings. Suitable aramid fibers are described in Man-Made Fibres—Science and Technology, Volume 2, in the section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred para-aramid is poly (p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2, 6-naphthaloyl chloride or chloro- or dichloroterephthaloyl chloride or 3, 4'-diaminodiphenylether. In some preferred embodiments, the yarns of the fiber-resin composite consist solely of PPD-T filaments; in some preferred embodiments, the layers in the fiber-resin composite consist solely of PPD-T yarns; in other words, in some preferred embodiments all filaments in the fiber-resin composite are PPD-T filaments.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3, 4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Examples of suitable yarn combinations are shown in Table 2.

TABLE 2

| First Reinforcement Layer(s) | Intermediate Reinforcement Layer(s) | Second Reinforcement Layer(s) |
|---|---|---|
| Kevlar ® 119 | Kevlar ® 29 | Kevlar ® 49 |
| Kevlar ® 119 (2 layers) | None | Kevlar ® 29 |
| Kevlar ® 119 (2 layers) | None | Kevlar ® 129 |
| Kevlar ® 119 (2 layers) | None | Kevlar ® 49 |
| Kevlar ® 119 | None | Kevlar ® 29 (2 layers) |
| Kevlar ® 119 | Kevlar ® 29 | Kevlar ® 129 |
| Kevlar ® 119 | Kevlar ® 29 | Kevlar ® 49 |
| Kevlar ® 119 | None | Kevlar ® 129 (2 layers) |
| Kevlar ® 119 | Kevlar ® 129 | Kevlar ® 49 |
| Kevlar ® 119 | None | Kevlar ® 49 (2 layers) |
| Kevlar ® 29 (2 layers) | None | Kevlar ® 129 |
| Kevlar ® 29 (2 layers) | None | Kevlar ® 49 |
| Kevlar ® 29 | Kevlar ® 129 (2 layers) | Kevlar ® 49 |
| Kevlar ® 29 | None | Kevlar ® 49 (2 layers) |
| Kevlar ® 129 (2 layers) | None | Kevlar ® 49 |
| Kevlar ® 129 | None | Kevlar ® 49 (2 layers) |
| Kevlar ® 119 | Kevlar ® 29 | Kevlar ® 49AP |
| Kevlar ® 119 | Kevlar ® 129 | Kevlar ® 49AP |
| Kevlar ® 129 | None | Kevlar ® 49 (2 layers) |
| Kevlar ® 119 | None | Kevlar ® 49 |
| Kevlar ® 119 | Kevlar ® 29 (next to 1st layer) Kevlar ® 129 (next to 2nd layer) | Kevlar ® 49 |

The multilayer hose as described above can be assembled with end couplings and other fittings into an umbilical suitable for use in deep-sea and other applications.

TEST METHODS

Test Method A is similar to ISO test method 1402:2009, Edition 4, dated 30 Nov. 2009. One end of the hose to be tested is connected to a pressure transducer capable of recording 100,000 psi. In addition, that end is connected to a vent valve to evacuate air from the hose prior to internal pressurization. The other hose end is connected to a MaxPro Technologies High Pressure water pump capable of delivering up to 100,000 psi pressure. The hose is placed on a track of linear bearings to permit axial contraction and growth.

The hydrostatic pump is turned on and the vent valve left open to fill the hose with water and vent all air from the system. With the air evacuated, the vent valve is closed and the hose cycled 5 times from 1000 psi to 10,000 psi to pre-strain the hose liner and reinforcing components. After the fifth cycle, the pressure is allowed to decrease to 100 psi, at which point pressure is increased at a rate of 500-600 psi per second until the hose fails.

EXAMPLES

Examples of the inventive concept were tested in a 12.7 mm (0.5 inch) internal diameter HCR hose. Examples prepared according to the current invention are indicated by numerical values. Control or Comparative Examples are indicated by letters.

Each hose comprised, in order, an interlocking carcass, a thermoplastic inner liner, a first fibrous reinforcement braid layer, a second fibrous reinforcement braid layer, and a thermoplastic outer cover.

The interlocking carcass, which is in commercial use, was of stainless steel, had an inner diameter of 12.7 mm and was 1.6 mm thick. The inner liner, which is also in commercial use, was of Nylon 11, had an inner diameter of 15.9 mm and was 1.3 mm thick. The outer cover, which is also in commercial use, was of polyurethane and was extruded above the second reinforcement layer.

In Comparative Example A, the first and second fibrous reinforcement layers were both braids comprising para-aramid Kevlar® 129 yarn from DuPont, having 24 braid plates with each braid plate having a linear density of 32000 dtex (28800 denier), a tenacity of 30 g/dtex (27.5 gpd) and a modulus of 833 g/dtex (750 gpd).

In Example 1, the first fibrous reinforcement layer was a braid comprising para-aramid Kevlar® 119 yarn from DuPont, having 24 braid plates with each braid plate having a linear density of of 20000 dtex (18000 denier), a tenacity of 27 g/dtex (24.3 gpd) and a modulus of 500 g/dtex (450 gpd). The second fibrous reinforcement layer was a braid comprising para-aramid Kevlar® 49AP yarn from DuPont, having 24 braid plates with each braid plate having a linear density of 18930 dtex (17040 denier), a tenacity of 25 g/dtex (22.5 gpd), and a modulus of 1033 g/dtex (930 gpd).

The hoses of Example 1 and Comparative Example A were subjected to a pressure burst test according to ISO test method 1402:2009, Edition 4, dated 30 Nov. 2009. The test results are shown in Table 3. It is seen that the burst pressure for hose Example 1 exceeds the burst pressure for hose Example A by four percent.

In Comparative Example B, the first fibrous reinforcement layer was a braid comprising para-aramid Kevlar® 49AP yarn from DuPont, having 24 braid plates with each braid plate having a linear density of 12624 dtex (11360 denier), a tenacity of 25 g/dtex (22.5 gpd) and a modulus of 1033 g/dtex. The second fibrous reinforcement layer was a braid comprising para-aramid Kevlar® 49AP yarn from DuPont, having 24 braid plates with each braid plate having a linear density of 18930 dtex (17040 denier), a tenacity of 25 g/dtex (22.5 gpd) and a modulus of 1033 g/dtex.

In Example 2, the first fibrous reinforcement layer was braid comprising para-aramid Kevlar® 119 yarn from DuPont having 24 braid plates with each braid plate having a linear density of 13360 dtex (12000 denier), a tenacity of 27 g/dtex (24.3 gpd) and a modulus of 500 g/dtex (450 gpd). The second fibrous reinforcement layer was a braid comprising para-aramid Kevlar® 49AP yarn from DuPont, having 24 braid plates with each braid plate having a linear density of 18930 dtex (17040 denier), a tenacity of 25 g/dtex (22.5 gpd) and a modulus of 1033 g/dtex.

The hoses of Example 2 and Comparative Example B were subjected to a pressure burst test according to Test Method A previously described. The test results are shown in Table 3. It is seen that the burst pressure for hose Example 2 exceeds the burst pressure for hose Example B by nineteen percent.

TABLE 3

|  | Yarn Modulus Layer 1 (g/dtex) | Yarn Modulus Layer 2 (g/dtex) | Burst Pressure (MPa) |
|---|---|---|---|
| Comparative A | 855 | 855 | 233 |
| Example 1 | 705 | 1033 | 243 |
| Comparative B | 1167 | 1033 | 148 |
| Example 2 | 705 | 1033 | 176 |

Example 1 in which the second layer yarn modulus is greater than the first layer yarn modulus showed a 4 percent improvement in burst pressure when compared with Comparative Example A in which the second layer yarn modulus is not greater than the first layer yarn modulus.

Example 2 in which the second layer yarn modulus is greater than the first layer yarn modulus showed an 18 percent improvement in burst pressure when compared with Comparative Example B in which the second layer yarn modulus is not greater than the first layer yarn modulus.

What is claimed is:

1. A multilayer hose, comprising in order:
   (i) a thermoplastic inner liner
   (ii) at least one first fibrous reinforcement layer comprising continuous filament yarns of aromatic polyamide or aromatic copolyamide having a yarn tenacity of at least 25 grams per dtex and a modulus of at least 500 g per dtex,
   (iii) at least one second fibrous reinforcement layer comprising continuous filament yarns of aromatic polyamide or aromatic copolyamide having a yarn tenacity of at least 25 grams per dtex and a modulus of at least 500 g per dtex, and
   (iv) a thermoplastic outer cover,
   wherein the continuous filament yarns of the at least one second fibrous reinforcement layer have a yarn modulus greater than the yarn modulus of the continuous filament yarns of the at least one first fibrous reinforcement.

2. A multilayer hose, comprising in order:
   (i) a thermoplastic inner liner,
   (ii) at least one first fibrous reinforcement layer comprising continuous filament yarns of aromatic polyamide or copolyamide having a yarn tenacity of at least 25 grams per dtex and a modulus of at least 500 g per dtex,
   (iii) at least one second fibrous reinforcement layer comprising continuous filament yarns of aromatic polyamide or copolyamide having a yarn tenacity of at least 25 grams per dtex and a modulus of at least 500 g per dtex,
   (iv) at least one intermediate fibrous reinforcement layer comprising continuous filament yarns of aromatic polyamide or copolyamide having a yarn tenacity of at least 25 grams per dtex and a modulus of at least 500 g per dtex positioned between the at least one first and the at least one second fibrous reinforcement layers, and
   (v) a thermoplastic outer cover,
   wherein
   (a) the continuous filament yarns of any at least one intermediate fibrous reinforcement layer have a yarn modulus greater than the yarn modulus of the continuous filament yarns of the at least one first fibrous reinforcement layer and no less than the yarn modulus of the continuous filament yarns of the at least one second fibrous reinforcement layer, and
   (b) the continuous filament yarns of any at least one intermediate fibrous layer have yarn modulus no less than yarn modulus of any other at least one intermediate fibrous reinforcement layer positioned closer to the at least one first layer.

3. The hose of claim 1 or 2, wherein the continuous filament yarns are twisted or entangled.

4. The hose of claim 1, wherein the first and, second fibrous reinforcement layers are in the form of a braid, a woven fabric, or a unidirectional fabric.

5. The hose of claim 4, wherein the braid, woven fabric, or unidirectional fabric is impregnated with resin.

6. The hose of claim herein the aromatic polyamide is p-aramid.

7. An umbilical, comprising the hose of claim 1 or claim 2.

8. The hose of claim 2, wherein the first, second and intermediate fibrous reinforcement layers are in the form of a braid, a woven fabric, or a unidirectional fabric.

9. The hose of claim 8, wherein the braid, woven fabric, or unidirectional fabric is impregnated with resin.

* * * * *